A. BOROFSKY.
AUTOMATIC LOCKING AND RETAINING DEVICE FOR STEERING MECHANISMS.
APPLICATION FILED JUNE 23, 1919.

1,415,300.

Patented May 9, 1922.
2 SHEETS—SHEET 1.

Inventor:
Allen Borofsky
by David Lichtenstein
Atty.

UNITED STATES PATENT OFFICE.

ALLEN BOROFSKY, OF AYER, MASSACHUSETTS.

AUTOMATIC LOCKING AND RETAINING DEVICE FOR STEERING MECHANISMS.

1,415,300.  Specification of Letters Patent.  Patented May 9, 1922.

Application filed June 23, 1919. Serial No. 305,980.

*To all whom it may concern:*

Be it known that I, ALLEN BOROFSKY, a citizen of the United States, and a resident of Ayer, in the county of Middlesex and State of Massachusetts, have invented a new and useful Improvement in Automatic Locking and Retaining Devices for Steering Mechanisms, of which the following is a specification, reference being had to the accompanying two sheets of drawings.

My invention relates more particularly to steering devices for automobiles, and its object is to provide a simple but reliable locking or retaining feature therefor which will prevent the same from becoming affected or influenced against the will of the operator by the sudden contact of either or both of the forward or steering wheels of the vehicle with obstructions met on the road and in the line of travel thereof.

Another object is to provide a locking or retaining device, as above explained, which is designed to work automatically, normally permitting the operator to manipulate at will the steering mechanism of the vehicle without interference, and otherwise serving as an automatic safety means for locking and retaining the steering mechanism of the vehicle in set position and preventing the same from becoming deflected, through outside agencies, from the given and desired course of travel.

Still another object is to provide more particularly a safety device for the steering gears of lighter automobiles (as the Ford for example) which are known to possess great tendencies for leaving the road on account of the flexible nature of the steering mechanism thereof. My device is designed to be readily associated with such automobiles without requiring any changes in the original mechanism of the steering gear, excepting that the device is coupled to the operating end of the steering post and is interposed between said post and the operating link thereof.

In order to illustrate my invention I have shown in the drawings, without being limited thereto, one embodiment thereof wherein the same is shown applied to a so-called Ford type of steering mechanism.

Referring to the accompanying two sheets of drawings:—

Figure 1:
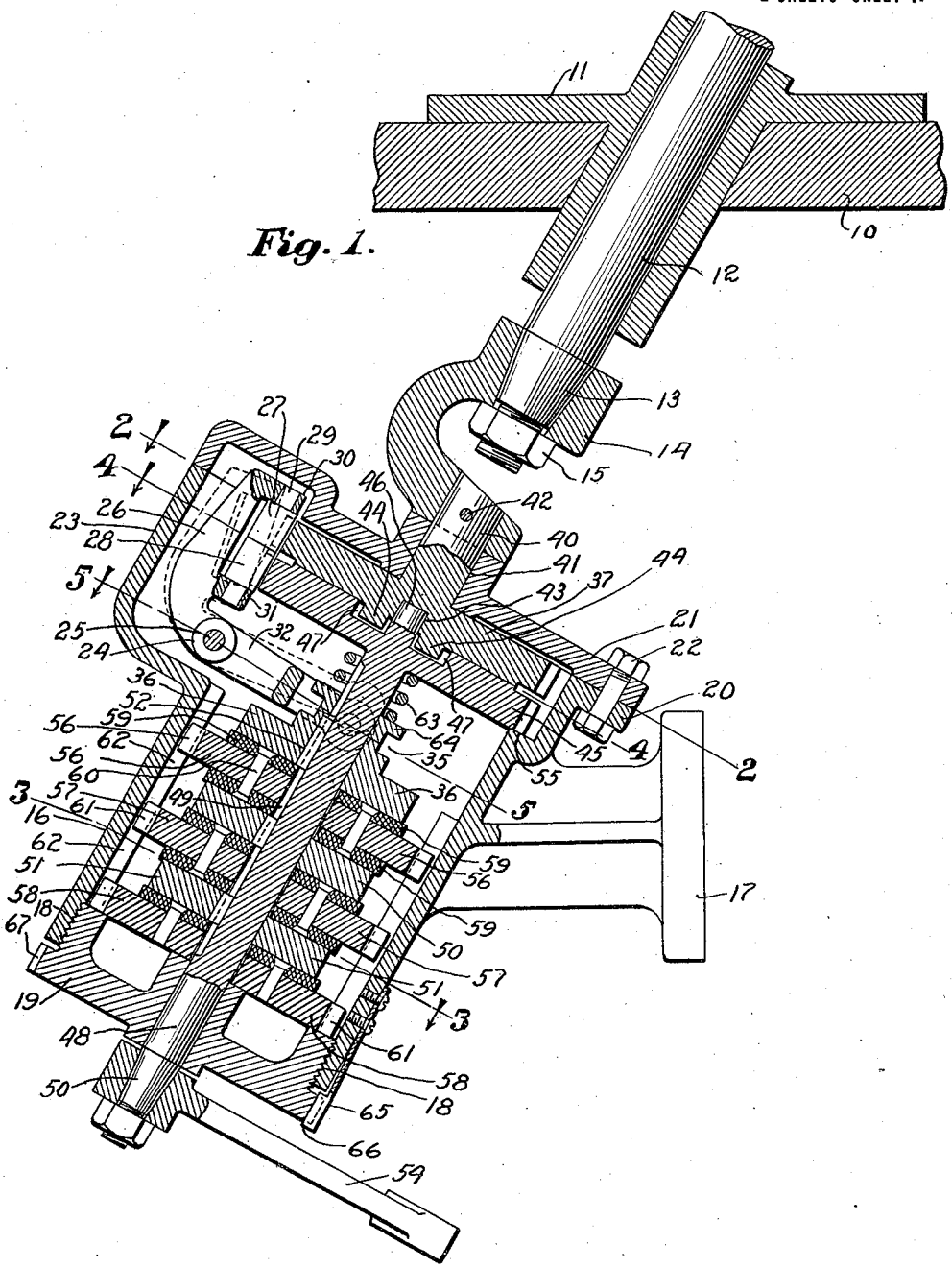
Fig. 1 represents a sectional view taken through the device, showing the same applied to the steering post of a so-called Ford automobile and in locked position.

The terms employed herein are used in the generic and descriptive sense to designate the elements illustrated, and are therefore not specifically intended as terms of limitation.

Like numerals refer to like parts throughout the several views of the drawings.

The numeral 10 represents the floor board of the vehicle to which is secured the steering post bearing member 11 in which the steering post 12 rotatably operates. The latter elements are intended to display the ordinary Ford steering gear parts, it being noted, however, that the usual drag-link-lever is removed from the tapered end 13 of the steering post and the coupling member 14 of my device is substituted therefor and secured thereto to rotate therewith by the nut 15 which was originally used for securing the drag-link-lever to the steering post.

Figure 5:
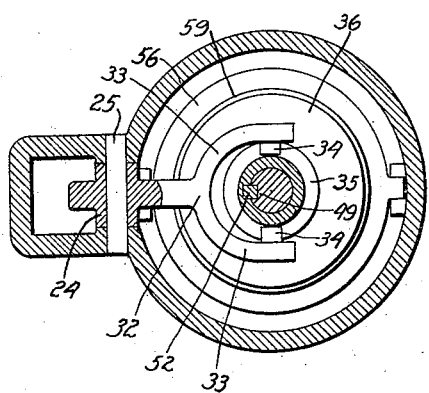
Fig. 5 represents a sectional view taken on line 5—5 in Fig. 1.

16 represents the casing member of the device which is preferably provided with the bracket member 17, or other similar means, for enabling the securing of the casing to a fixed portion of the vehicle, as the frame or chassis, for holding said casing member in alignment with the steering post. Said casing member 16 is preferably open at both ends thereof, being preferably threaded at the lower end 18, as shown, for engaging the take-up-cap 19, while at the upper end the same is preferably provided with the cap retaining flange 20 which carries the cap 21 secured thereto by the bolts 22. The casing member 16 is further preferably provided with the extension section 23 which houses the bell-crank member 24 and forms the support for the pivoting stud 25 (Fig. 5) upon which the bell-crank member 24 is fulcrumed. The cap 21 is correspondingly extended to cover the extension section 23 of the casing member 16, as shown in Fig. 1.

The bell-crank member 24 is preferably designed with the roller arm 26, which carries the free rollers 27 and 28 on the fixed stud 29 which is supported in the lugs 30 and 31 provided therefor. The clutch arm 32 of the bell-crank member 24 is preferably provided with the forked section 33 which carries the clutch fingers 34 which engage with the clutch collar recess 35 of the sliding clutch member 36.

37 represents a serrated or scalloped cam disc member which is provided with the circumferential series of alternating scallops 38 and depressions 39 about the periphery thereof, and with the stud 40 projecting through the bearing 41 provided therefor in the cap member 21, said stud 40 being secured to the coupling member 14 by means of the pin 42, as shown, or by any other suitable means for rotating therewith, said disc 37 being further provided with the central bearing 43 and the projecting coupling clutch lugs 44.

45 represents a second serrated and scalloped cam disc member which is similar in size and circumferential outline to the first mentioned disc member 37 but is provided with the bearing stud 46 which projects within the bearing 43 provided therefor in the member 37, the coupling clutch lug recesses 47 within which the clutch lugs 44 set and operate, and the projecting spindle shaft 48, which is preferably suitably slotted lengthwise at 49 for forming a keyway for the friction clutch discs 36, 50 and 51 which are each provided with the keys 52 for holding said clutch discs slidably secured to said spindle shaft 48 but rotatable therewith. The end 50 of the spindle shaft 48 is preferably tapered and threaded to accommodate the drag-link-lever 54 and nut therefor as shown for securing said drag-link-lever to operate with said spindle shaft. It being here noted that the spindle may preferably be designed of a suitable size so that the same will accommodate the original drag-link-lever which was removed from the end 13 of the steering post 12.

The casing member 16 is preferably provided with the shoulder 55 against which the disc member 45 may be seated, as shown in Fig. 1, and held adjacently set with the disc member 37.

56, 57 and 58 represent the friction clutch intermediate discs which are set with suitable clearance over the spindle 48 and between the keyed clutch discs 36, 50 and 51, and are provided with the friction facings 59 secured thereto in any suitable manner, as by the pins 60, and are preferably further provided with the locking lugs 61 which are slidably keyed to the runs 62 provided therefor in the casing member 16 for allowing the intermediate discs to slide thereon but held against rotating.

63 represents a suitable expansion spring which acts between the collar 64 of the clutch disc 36 and the underside of the lower disc 45 for forcing the friction clutch discs to close up and at the same time for engaging the rollers 27 and 28 with the serrations of the discs 37 and 45, respectively.

65 represents a key plate which may be secured to the casing 16 and is provided with the lug 66 which engages the teeth 67 provided about the periphery of the take-up collar 19 for adjusting purposes.

Having thus described the parts of my invention in detail, I shall now describe the manner in which the same may be applied and operated.

Figure 4:
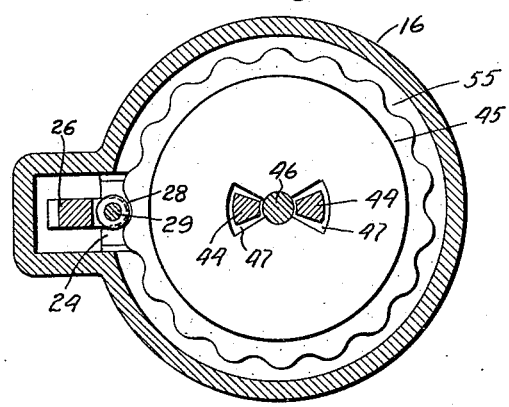
Fig. 4 represents a sectional view taken on line 4—4 in Fig. 1.

It will be noted—first, that the device is designed to house all the mechanisms thereof within the casing member, in a compact, self-contained and fool-proof manner, having means for readily associating the same in working relationship with the steering gear to be supplied therewith, the casing member proper being held rigidly secured against movement, as by being bolted or otherwise suitably held with the frame or chassis of the vehicle. Secondly, the multiple discs mounted on the spindle 48 of the device form an ordinary friction clutch therefor. Thirdly, the two cam discs 37 and 45 are coupled to operate together in either direction of rotation through the coacting coupling means provided therebetween in the shape of the lugs 44 and the slots 47. Said slots 47 are made larger than the width of the lugs 44, as shown in Fig. 4, for allowing a play therebetween to yield a floating connection thereto for affording a leading, angular movement for the upper cam and steering post disc 37 in relation to the position of the lower cam or steering lever disc 45 in either direction of rotation of said steering post disc 37. Fourthly, the co-operation of the aforesaid cam discs furnishes the locking and unlocking features for the aforesaid friction clutch of the device through the medium of the bell-crank member 24 operating therebetween and actuating said bell-crank member. Fifthly, the friction on said friction clutch of the device may be adjusted to suit conditions by the manipulation of the adjusting or take-up collar 19; and sixthly, the device may be coupled with the steering post of the steering gear and communicates through it the turning effort of the steering post to the drag-link-lever.

With the above in mind, the device operates as follows:—

Figure 2:
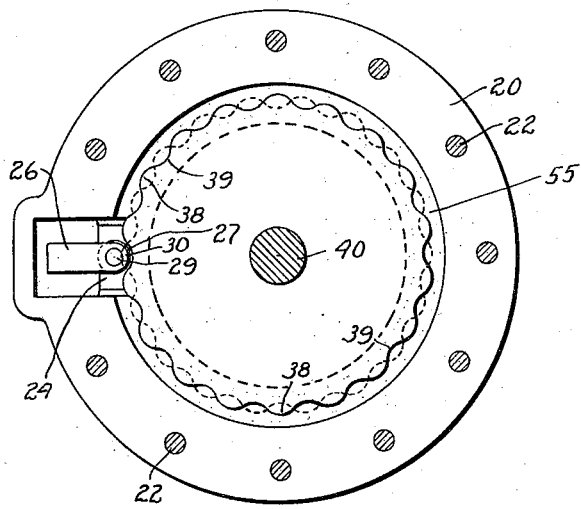
Fig. 2 represents a sectional view taken on line 2—2 in Fig. 1.
Figure 3:
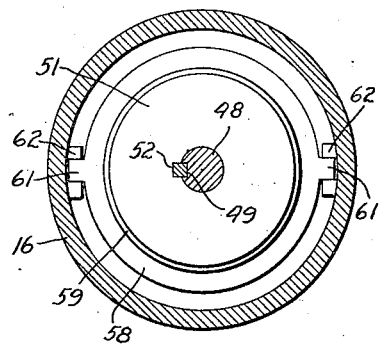
Fig. 3 represents a sectional view taken on line 3—3 in Fig. 1.

When the steering post 12 is held or left set in a given position by the operator, the device will become locked, as shown in Figs. 1, 2 and 3; that is, the two cam discs will be so positioned that the scallops and depressions of the top one 37 will lay superimposed over that of the lower one 45 (that is to say they register), and the rollers 27 and 28 of the bell-crank member 24 will engage with the adjacent or registering depressions of the two cam discs, as shown in said Figs. 1, 2 and 3. With the rollers thus set in the registering depressions of the cam discs, the expansion spring 63 forces against the collar 64 of the clutch disc 36 which closes up the friction clutch discs 36, 56, 50, 57, 51 and 58 and holds them jammed against the take-up collar 19, whereupon, because of the friction thus set up between the non-rotatable casing-held discs 56, 57 and 58 and the discs 36, 50 and 51, which are keyed to turn with the spindle 48 as herein previously described, the lower cam disc 45 becomes locked through said friction clutch discs against turning. Thus it will be understood that any tendency to turn the spindle 48 through the manipulation of the drag-link-lever 54 will be prevented through said friction clutch mechanism of the device. Therefore, while said friction clutch is so locked against permitting the spindle 48 to turn, the steering post 12, through its connection therewith, is also held against turning. Thus it will be understood that the device under such circumstances serves to hold the steering mechanism of the steering gear, from the drag-link lever on to the wheels steered thereby, in locked position and corresponding to the setting given the same by the operator, so that any road obstruction coming into contact with either or both of the wheels steered by the steering mechanism will have no free give to the steering gear mechanism, as hitherto, on account of the locking feature provided thereagainst by my device.

Now, on the other hand, while the device may serve to lock the steering mechanism against working of its own motion, as above explained, yet the same does not hinder or interfere with said steering mechanism during the interval that the same is being operated through the manipulation of the steering post by the operator. The first few degrees of turning of the steering post 12 by the operator in either of its turning directions disengages the roller arm of the bell-crank member 24 from the depressions of the cam discs 37 and 45, since the roller arm 26, when the cam disc 37 is rotated with the steering post 12, is forced to move away to permit the peak of the scallops 38 to pass by the roller 27, as indicated by the dotted cam disc member shown in Fig. 2. The clearance or play provided between the sides of the lugs 44 and the slots 47 of the cam disc coupling clutch allows said upper cam disc 37 to move angularly far enough ahead of the lower cam disc 45 so that the scallops 38 of the top disc 37 will be midway between, and out of register with the scallops of the lower cam disc 45. After this angular lead is first obtained between the two cam discs, then through the contact of the sides of the lugs 44 with the sides of the slots 47 the two cam discs 37 and 45 will rotate together with the steering post 12 of the steering gear. Thus, while the operator keeps turning the two cam discs, which are now out of register, together, the alternatively positioned peaks of the scallops of the two cam discs will hold the roller arm 26 back, as shown dotted in Fig. 1, and will prevent the same from engaging the rollers 27 and 28 with the locking recesses or depressions 39 of the cam discs 37 and 45. This holding back of the bell-crank arm 26 causes the clutch arm 32 to compress the spring 63 and to force the clutch 36 to slide upward upon the spindle 48 and away from the friction disc 56, with the natural result that all the discs of the friction clutch being relieved of the friction therebetween become loosened or opened up and the spindle becomes free to turn with the discs 36, 50 and 51 which are slidably keyed thereto but secured to turn therewith. The operator is thus enabled to steer the steering mechanism through the device without any interference therefrom.

Now, when the operator has completed the steering function he can again lock the device by turning the steering post, in the opposite direction to what he was turning it, but a few degrees to again centralize the lugs 44 within the slots 47, as shown in Fig. 4, when the two cam discs 37 and 45 will again be positioned with the depressions thereof adjacent to each other and registering so that the rollers 27 and 28 may be forced within the same by the action of the expansion spring 63 against the bell-crank arm 32 which will again lock the friction clutch of the device and the same becomes locked as before explained.

This locking and unlocking feature of the device holds true for either direction of rotation of the steering post 12.

It will also be observed that even while the operator may be in the act of manipulating the steering gear, that should either or both of the steering wheels meet with an obstruction on the road which would be forceful enough to tend to deflect them, that such motion would only tend to advance the lower cam disc 45 sufficiently so that the angular relationship between it and the upper cam disc 37 would be altered and the depressions thereof would again become adjacent to each other and registered, with the result that the bell-crank member 24 would again become set therewith and the device would automatically lock and prevent any further deflection of the steering gear, thus serving as a safety means for the moment and preventing a possible accident.

It will thus be observed that the device is simple in construction and absolutely reliable in its operation, and that the same may be readily applied to work in connection with the ordinary types of steering gears employed for steering automobiles, and furnishes a safety device therefor which will eliminate a common cause for accidents occurring frequently because of the lack of protection afforded by this device in preventing any give to, or shifting of, the steering mechanism unless desired by the operator and directed to it through the manipulation of the steering post.

While the preferred embodiments of my invention have been described in detail, it will be understood that I do not wish to be limited to the particular construction set forth, since various changes in the form, material, proportions, arrangement of parts, and in the details of construction, may be resorted to without departing from the spirit and scope of the invention, or destroying any of the advantages contained in the same, heretofore described and defined in the subjoined claims.

Having thus described my invention in detail, what I claim as new is:

1. A device of the character described, comprising a casing member adapted to be secured to a fixed member for remaining stationary therewith; co-related adjacent and peripherally scalloped disc members coupled to operate together with means provided therebetween for yielding angular play to effect a lead and lag between them, said disc members being rotatably mounted within said casing member and each provided with centrally located spindles projecting in opposite directions and protruding beyond said casing, one engaging with the steering post for rotating therewith, and the other engaging with the steering mechanism operating link; a friction disc clutch mounted on said latter spindle and adapted to control the turning operations thereof; and a co-related transmitting lever adapted to couple said peripherally scalloped disc members with said spindle clutching mechanism for locking and releasing the spindle therewith.

2. A device of the character described comprising a casing member housing a pair of rotatable and adjacently set cam discs provided with central stems on the non-adjacent surfaces thereof projecting therefrom in opposite directions and protruding through said casing member, one of said stems being provided with means for engaging the same with the steering post and the other for engaging the drag-link-lever, said adjacent cam discs being provided with floatable co-acting, coupling means therebetween adapted to couple the same to operate together with a lead and lag relationship between said cam discs; a multiple disc friction clutch mechanism coupled with and mounted on the stem of the cam disc engaging with the drag-link-lever anchored to said casing member and provided with yielding expansion means normally adapted to hold said multiple disc clutch frictionally closed and against permitting said stem to rotate therein; and a fulcrumed cam disc operated friction clutch member adapted to be operated by said cam discs for releasing and locking said multiple friction clutch mechanism with said cam disc stem.

3. A device of the character described, comprising a casing member housing a pair of rotatable and adjacently set cam discs provided with central stems on the non-adjacent surfaces thereof projecting therefrom in opposite directions and protruding through said casing member, one of said stems being provided with means for engaging the same with the steering post and the other for engaging the drag-link-lever, said adjacent cam discs being provided with floatable co-acting, coupling means therebetween adapted to couple the same to operate together with a lead and lag relationship between said cam discs; a multiple disc friction clutch mechanism coupled with and mounted on the stem of the cam disc engaging with the drag-link-lever anchored to said casing member and provided with yielding expansion means normally adapted to hold said multiple disc clutch frictionally closed and against permitting said stem to rotate therein; a fulcrumed cam disc operated friction clutch member adapted to be operated by said cam discs for releasing and locking said multiple friction clutch mechanism with said cam disc stem; and means for adjusting the friction of said multiple disc friction clutch mechanism.

4. A device of the character described, comprising a casing member housing a pair of rotatable and adjacently set cam discs provided with a circumferential series of peripheral cams and central stems on the non-adjacent surfaces thereof projecting therefrom in opposite directions and protruding through said casing member, one of said stems being provided with means for engaging the same with the steering post and the other for engaging the drag-link-lever, said adjacent cam discs being provided with floatable co-acting, coupling means therebetween adapted to couple the same to operate together with a lead and lag relationship between said cam discs; a multiple disc friction clutch mechanism coupled with and mounted on the stem of the cam disc engaging with the drag-link-lever anchored to said casing member and provided with yielding expansion means normally adapted to hold said multiple disc clutch frictionally closed and against permitting said stem to rotate therein; and a fulcrumed cam disc operated friction clutch lever pivotally secured to said casing member adapted to be operated by said peripheral cams on said cam discs for releasing and locking said multiple friction clutch mechanism with said cam disc stem.

5. A device of the character described, comprising a casing member housing a pair of rotatable and adjacently set cam discs provided with a circumferential series of peripheral cams and central stems on the nonadjacent surfaces thereof projecting therefrom in opposite directions and protruding through said casing member, one of said stems being provided with means for engaging the same with the steering post and the other for engaging the drag-link-lever, said adjacent cam discs being provided with floatable co-acting, coupling means therebetween adapted to couple the same to operate together with a lead and lag relationship between said cam discs; a multiple disc friction clutch mechanism coupled with and mounted on the stem of the cam disc engaging with the drag-link-lever anchored to said casing member and provided with yielding expansion means normally adapted to hold said multiple disc clutch frictionally closed and against permitting said stem to rotate therein; a fulcrumed cam disc operated friction clutch lever pivotally secured to said casing member, adapted to be operated by said peripheral cam on said cam discs for releasing and locking said multiple friction clutch mechanism with said cam disc stem; and means for adjusting the friction of said multiple disc friction clutch mechanism.

6. A device of the character described, comprising a serrated or scalloped disc member adapted to be rotatably coupled with the steering post and provided with clutching means; a second similar serrated or scalloped disc member adapted to set adjacent with the former disc member and provided on the adjacent side thereof with co-acting clutching means engaging with said first mentioned clutching means and on the other side with a spindle projecting therefrom; slidable clutching discs keyed to said spindle and adapted to rotate therewith and slidably move thereon; intermediate friction discs interposed between said clutching discs freely mounted on said spindle and provided with locking lugs; an expansion member adapted to frictionally force said slidable clutching discs against said friction discs; a cam actuated member adapted to be operated by said scalloped disc members for disenergizing the action of said expansion member against said clutching and friction disc; a casing member adapted to enclose the aforesaid elements and provided with means for engaging said friction disc locking lugs for slidably retaining said discs therewith; means for rotatably supporting said scalloped discs therein; and means for rigidly securing said casing member in alignment with said steering post.

7. A device of the character described, comprising a serrated or scalloped disc member adapted to be rotatably coupled with the steering post and provided with clutching means; a second similar serrated or scalloped disc member adapted to set adjacent with the former disc member and provided on the adjacent side thereof with co-acting clutching means engaging with said first mentioned clutching means and on the other side with a spindle projecting therefrom and adapted to engage the steering mechanism operating link; slidable and frictional clutching discs keyed to said spindle and adapted to rotate therewith and slidably move thereon; intermediate friction discs interposed between said clutching discs freely mounted on said spindle and provided with locking lugs; an expansion member adapted to force said slidable clutching discs against said friction discs; a pivoted clutch operating member adapted to be operated by said first mentioned serrated discs for releasing or engaging the clutching discs of the device; a casing member adapted to enclose the aforesaid elements and provided with means for engaging said friction disc locking lugs for slidably retaining said discs therewith; means for rotatably supporting said spindle and cam discs; means for pivotally holding said pivoted clutch operating member; means for relatively adjusting the friction of said friction clutch discs; and means for rigidly securing said casing member in alignment with said steering post.

In testimony whereof, I hereunto set my hand this eighteenth day of June, 1919.

ALLEN BOROFSKY.